US011859980B2

(12) United States Patent
Yang et al.

(10) Patent No.: US 11,859,980 B2
(45) Date of Patent: Jan. 2, 2024

(54) METHOD OF MOVEMENT TRACKING, PROCESSING MODULE AND LAWN MOWER

(71) Applicant: URSrobot Inc., Taipei (TW)

(72) Inventors: Yaun-Ren Yang, Taipei (TW); Chung-Hou Wu, Taipei (TW); Chao-Cheng Chen, Taipei (TW)

(73) Assignee: URSROBOT INC., Taipei (TW)

( * ) Notice: Subject to any disclaimer, the term of this patent is extended or adjusted under 35 U.S.C. 154(b) by 399 days.

(21) Appl. No.: 17/081,610

(22) Filed: Oct. 27, 2020

(65) Prior Publication Data

US 2021/0123742 A1     Apr. 29, 2021

(30) Foreign Application Priority Data

Oct. 29, 2019  (TW) ................................. 108139052

(51) Int. Cl.

| G01C 21/20 | (2006.01) |
| G01C 21/16 | (2006.01) |
| H04B 17/318 | (2015.01) |
| G06T 7/73 | (2017.01) |
| G01S 19/47 | (2010.01) |
| G06V 10/56 | (2022.01) |
| G06V 20/10 | (2022.01) |

(52) U.S. Cl.
CPC ........... *G01C 21/165* (2013.01); *G01C 21/20* (2013.01); *G01S 19/47* (2013.01); *G06T 7/73* (2017.01); *G06V 10/56* (2022.01); *G06V 20/10* (2022.01); *H04B 17/318* (2015.01); *G06T 2207/30188* (2013.01)

(58) Field of Classification Search
None
See application file for complete search history.

(56) References Cited

U.S. PATENT DOCUMENTS

| 2014/0172293 A1* | 6/2014 | Chang .................. G01C 21/165 |
| | | 701/446 |
| 2018/0172468 A1* | 6/2018 | Sagall ................ G01C 21/3626 |
| 2019/0234740 A1* | 8/2019 | Gabbay .............. G01C 21/3415 |
| 2019/0265042 A1* | 8/2019 | Prasad ............... G01C 21/3844 |
| 2019/0346848 A1* | 11/2019 | Zhou ....................... G06Q 10/04 |
| 2020/0080865 A1* | 3/2020 | Ervin ................. G01C 21/3667 |
| 2021/0033738 A1* | 2/2021 | Liang ....................... G01S 19/49 |
| 2021/0108924 A1* | 4/2021 | Vedaste ............. G01C 21/3848 |
| 2021/0116579 A1* | 4/2021 | Rezaei .................... G01S 19/25 |

* cited by examiner

*Primary Examiner* — James M Mcpherson
(74) *Attorney, Agent, or Firm* — Birch, Stewart, Kolasch & Birch, LLP

(57) ABSTRACT

A method of movement tracking includes: performing, when it is determined that a strength of an external signal is greater than a threshold, positioning based on the signal to generate a first record; performing, when it is determined that the strength is not greater than the threshold, measurement of a movement variation to generate a second record; performing, when it is determined that the strength increases from being not greater than the threshold to being greater than the threshold, positioning based on the signal to obtain coordinates of an exact position; and computing corrected data based on the second record and the coordinates, and generating a movement path record based on the first record and the corrected data.

13 Claims, 4 Drawing Sheets

METHOD OF MOVEMENT TRACKING, PROCESSING MODULE AND LAWN MOWER

CROSS-REFERENCE TO RELATED APPLICATION

This application claims priority of Taiwanese Invention Patent Application No. 108139052, filed on Oct. 29, 2019.

FIELD

The disclosure relates to a method of movement tracking, a processing module implementing the method, and a lawn mower including the processing module.

BACKGROUND

A conventional electronic device (e.g., an automatic lawn mower or an automatic cleaner) performs positioning based on global positioning system (GPS) signals, and tracks its movement based on results of the positioning. However, when signal strength of the GPS signals is lower than a strength threshold, the conventional electronic device may fail to generate an exact result of the positioning, and thus fail to correctly track its movement.

SUMMARY

Therefore, an object of the disclosure is to provide a method of movement tracking, a processing module and a lawn mower that can alleviate at least one of the drawbacks of the prior art.

According to one aspect of the disclosure, a processing module includes a first positioning device, a second positioning device, and a processor electrically connected to the first positioning device and the second positioning device.

The first positioning device is configured to, when it is determined by the processing module that signal strength of an external positioning signal is greater than a predefined strength threshold, periodically perform positioning based on the external positioning signal so as to locate the processing module, and the processor is configured to generate a first path record based on a result of the positioning performed by the first positioning device.

The second positioning device is configured to, when it is determined by the processing module that the signal strength of the external positioning signal is not greater than the predefined strength threshold, periodically perform measurement of a variation in movement of the processing module, and the processor is configured to generate a second path record based on a result of the measurement of the variation in movement performed by the second positioning device.

The first positioning device is further configured to, when it is determined by the processing module that the signal strength of the external positioning signal increases from being not greater than the predefined strength threshold to being greater than the predefined strength threshold, perform positioning based on the external positioning signal so as to obtain a coordinate set of an exact position of the processing module.

The processor is further configured to compute, based on the second path record and the coordinate set of the exact position of the processing module, corrected path data related to the second path record, and to generate a movement path record based on the first path record and the corrected path data.

According to another aspect of the disclosure, a method of movement tracking is implemented by the processing module that is previously described. The method includes steps of:

A) periodically performing, when it is determined by the processing module that signal strength of an external positioning signal is greater than a predefined strength threshold, positioning based on the external positioning signal so as to locate the processing module, and generating a first path record based on a result of the positioning;

B) periodically performing, when it is determined by the processing module that the signal strength of the external positioning signal is not greater than the predefined strength threshold, measurement of a variation in movement of the processing module, and generating a second path record based on a result of the measurement of the variation in movement;

C) performing, when it is determined by the processing module that the signal strength of the external positioning signal increases from being not greater than the predefined strength threshold to being greater than the predefined strength threshold, positioning based on the external positioning signal so as to obtain a coordinate set of an exact position of the processing module; and D) computing, based on the second path record and the coordinate set of the exact position of the processing module, corrected path data related to the second path record, and generating a movement path record based on the first path record and the corrected path data.

According to still another aspect of the disclosure, a lawn mower includes the processing module that is previously described.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
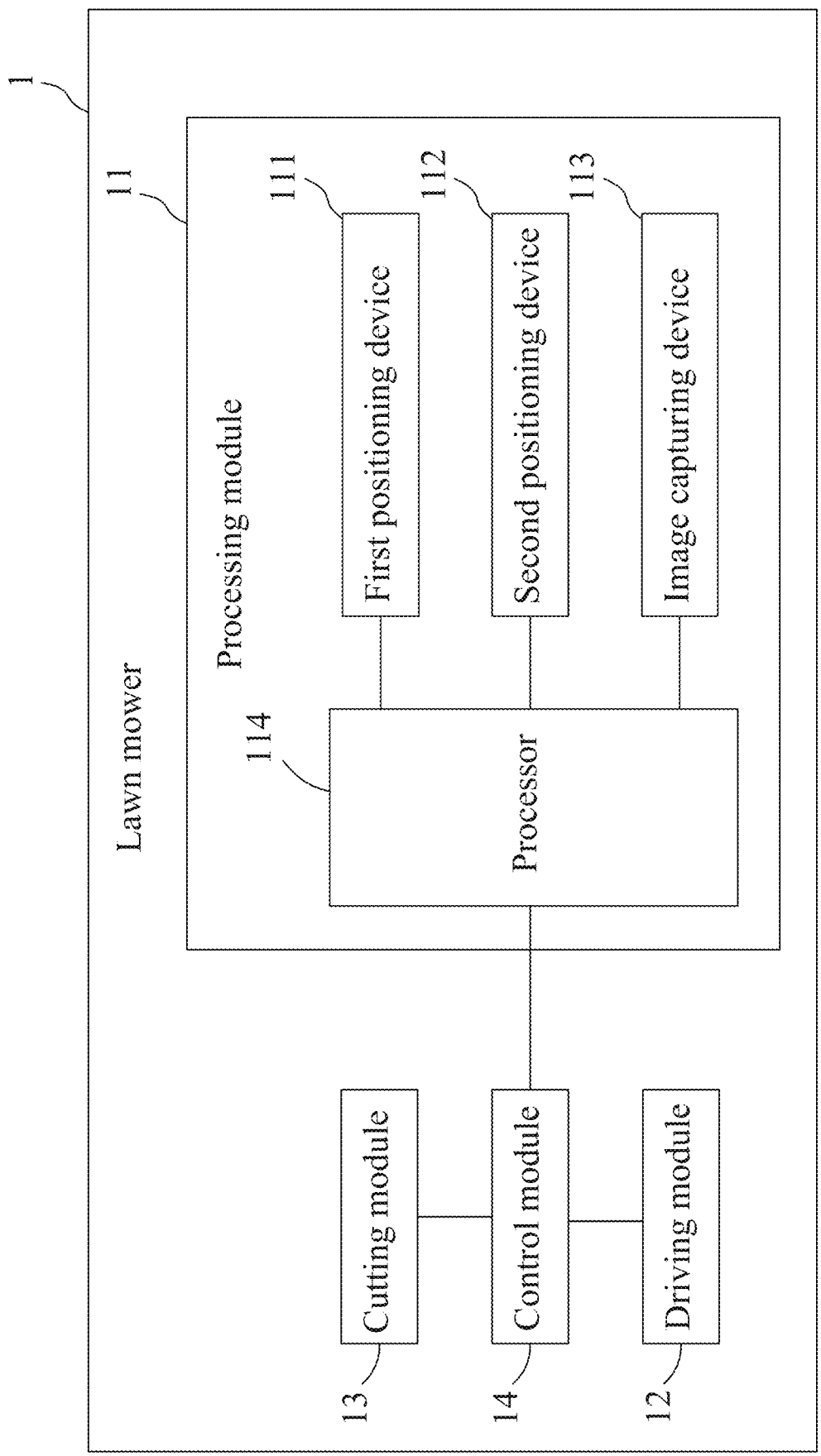
FIG. 1 is a block diagram illustrating an embodiment of a lawn mower including a processing module according to the disclosure.

Referring to FIG. 1, an embodiment of a lawnmower 1 according to the disclosure is illustrated. The lawn mower 1 is adapted to cut grass. The lawn mower 1 includes a processing module 11, a driving module 12, a cutting module 13, a control module 14, and a main body (not shown) accommodating the processing module 11, the driving module 12, the cutting module 13 and the control module 14.

The control module 14, such as a microcontroller, is configured to control operation of the driving module 12 and the cutting module 13. More specifically, the driving module 12 exemplarily includes a plurality of wheels (not shown) and a driver, such as a motor (not shown). The driver is couple to the wheels, and is electrically connected to the control module 14. The control module 14 controls the driving module 12 to drive the main body of the lawn mower 1 to proceed and rotate. The cutting module 13 exemplarily includes at least one blade (not shown), and is controlled by the control module 14 to cut grass. Since implementation of the physical structure of the lawn mower 1 has been well known to one skilled in the relevant art, detailed explanation of the same is omitted herein for the sake of brevity.

The processing module 11 includes a first positioning device 111, a second positioning device 112, an image capturing device 113, and a processor 114 electrically connected to the first positioning device 111, the second positioning device 112 and the image capturing device 113.

The processor 114 may be implemented by a central processing unit (CPU), a microprocessor, a micro control unit (MCU), a system on a chip (SoC), or any circuit configurable/programmable in a software manner and/or hardware manner to implement functionalities discussed in this disclosure.

The image capturing device 113 is implemented by a camera mounted on the main body of the lawn mower 1. The image capturing device 113 is configured to perform image capturing to capture images of surroundings in front of the lawnmower 1 so as to generate image data. In this embodiment, the image data includes a video, but is not limited thereto. For example, the image data may include a photo in other embodiments.

The first positioning device 111 is configured to receive an external positioning signal, and to perform positioning based on the external positioning signal. In this embodiment, the first positioning device 111 is implemented by a global positioning system (GPS) receiver which adopts the real time kinematic (RTK) technique and provides up to millimetre-level accuracy; the external positioning signal is a GPS signal. However, implementations of the first positioning device 111 and the external positioning signal are not limited to the disclosure herein and may vary in other embodiments. For example, in other embodiments, the first positioning device 111 may be implemented by a GPS receiver which does not adopt the RTK technique, or by a wireless-signal positioning device which performs positioning based on wireless signals such as Bluetooth signals or Wi-Fi signals.

The second positioning device 112 is configured to perform inertial measurement (IM), i.e., to perform measurement of a variation in movement of the processing module 11. In this embodiment, the variation in movement of the processing module 11 includes angular velocity and linear acceleration. The second positioning device 112 is further configured to perform positioning based on a result of the inertial measurement. In this embodiment, the second positioning device 112 is implemented by an inertial measurement unit (IMU), which exemplarily includes a six-axis sensor. Specifically speaking, the six-axis sensor includes a three-axis accelerometer and a three-axis gyroscope. The second positioning device 112 is capable of measuring angular velocity and linear acceleration that are related to movement of the second positioning device 112 in three dimensional space, and is capable of performing positioning based on the measurement of angular velocity and linear acceleration without relying on any external signal so as to locate the second positioning device 112 with respect to a reference position. However, implementation of the second positioning device 112 is not limited to the disclosure herein and may vary in other embodiments. For example, in other embodiments, the second positioning device 112 may be implemented by an IMU including a nine-axis sensor, which includes a three-axis accelerometer, a three-axis gyroscope and a three-axis magnetometer.

It should be noted that since positioning by the second positioning device 112 does not rely on any external signal, an error in a positioning result obtained by the second positioning device 112 may be larger than that in a positioning result obtained by the first positioning device 111. Moreover, the error in the positioning result obtained by the second positioning device 112 may accumulate and become large over time during positioning.

In this embodiment, the processing module 11 is switchable between a first recording mode and a second recording mode based on signal strength of the external positioning signal (i.e., the GPS signal). When it is determined by the processing module 11 that the signal strength of the external positioning signal is greater than a predefined strength threshold, the processing module 11 switches to the first recording mode. On the other hand, when it is determined by the processing module 11 that the signal strength of the external positioning signal is not greater than the predefined strength threshold, the processing module 11 switches to the second recording mode.

When the processing module 11 operates in the first recording mode, the first positioning device 111 is configured to periodically perform positioning based on the external positioning signal so as to locate the processing module 11 and generate a plurality of coordinate sets. The coordinate sets thus generated are in chronological order, and are GPS coordinates in this embodiment. The first positioning device 111 is further configured to continuously provide the coordinate sets (referred to as a first group of coordinate sets) to the processor 114. The processor 114 is configured to generate a first path record based on a result (i.e., the first group of coordinate sets) of the positioning performed by the first positioning device 111, and to periodically update the first path record based on the latest coordinate set among the first group of coordinate sets. It should be noted that in this embodiment, operation of the second positioning device 112 is suspended when the processing module 11 operates in the first recording mode. However, operation of the second positioning device 112 when the processing module 11 operates in the first recording mode is not limited to being suspended as disclosed herein and the second positioning device 112 may have different operation states when the processing module 11 operates in the first recording mode in other embodiments.

When the processing module 11 operates in the second recording mode, the second positioning device 112 is configured to periodically perform positioning by means of inertial measurement (IM, i.e., measurement of a variation in movement of the processing module 11) so as to locate the processing module 11 and generate a plurality of coordinate sets. The coordinate sets thus generated are in chronological order, and the second positioning device 112 is configured to continuously provide the coordinate sets (referred to as a second group of coordinate sets) to the processor 114. The processor 114 is configured to generate a second path record based on a result (i.e., the second group of coordinate sets) of the measurement of the variation in movement performed by the second positioning device 112, and to periodically update the second path record based on the latest coordinate set among the second group of coordinate sets. Likewise, operation of the first positioning device 111 is suspended when the processing module 11 operates in the second recording mode. However, operation of the first positioning device 111 when the processing module 11 operates in the second recording mode is not limited to being suspended as disclosed herein and the first positioning device 111 may have different operation states when the processing module 11 operates in the second recording mode in other embodiments.

Figure 3:
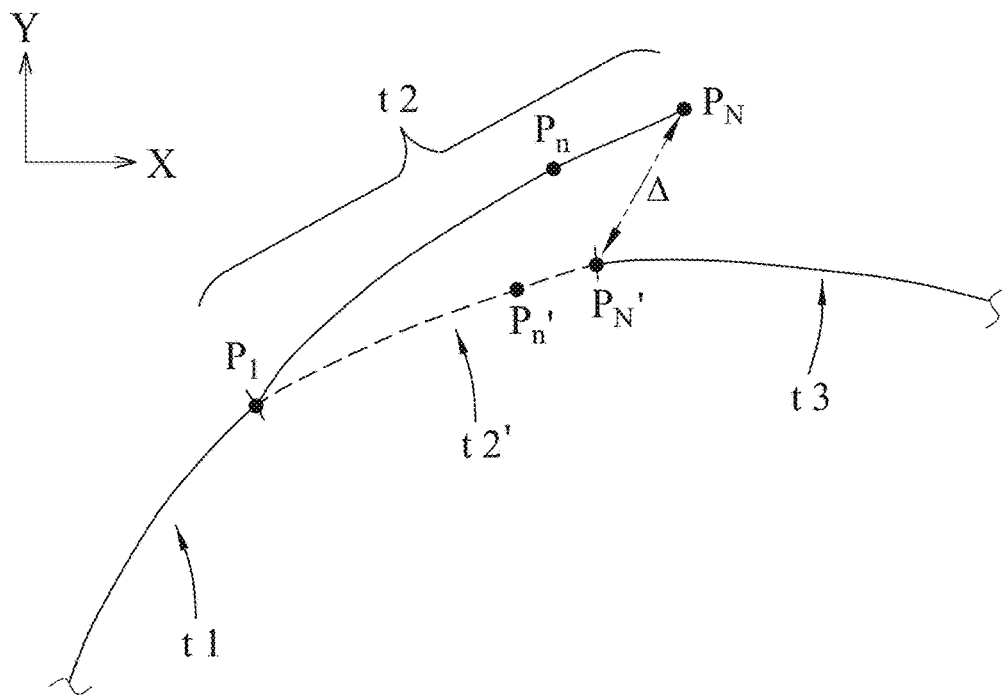
FIG. 3 is a schematic diagram partially illustrating an example of a path tracked by the method according to the disclosure.
Figure 6:
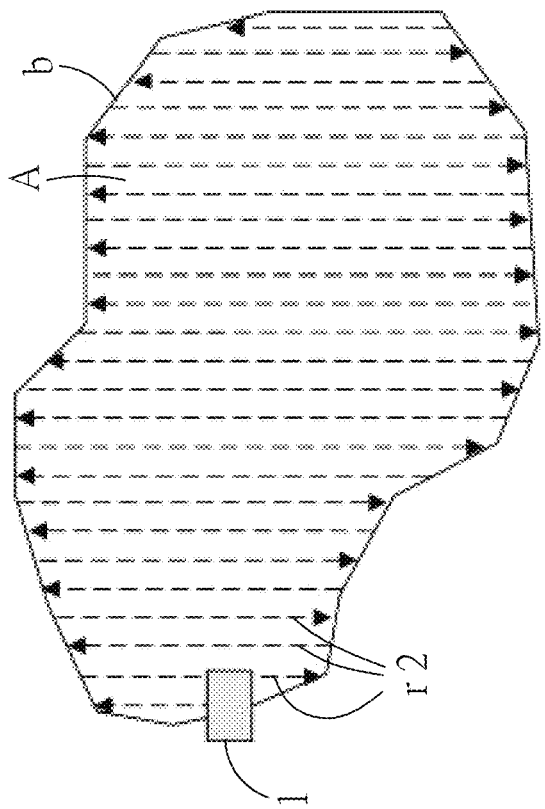
FIG. 6 is a schematic diagram illustrating an example of second working paths planned by the method according to the disclosure.
Figure 5:
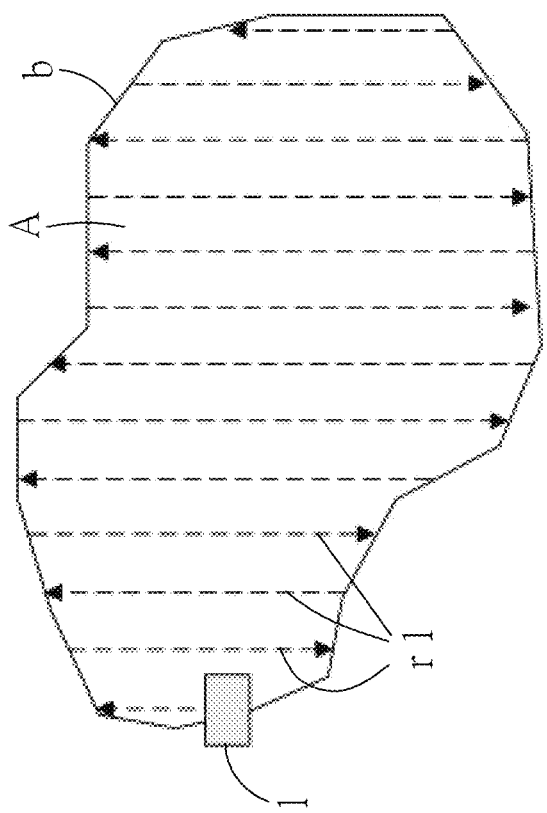
FIG. 5 is a schematic diagram illustrating an example of first working paths planned by the method according to the disclosure.

It should be noted that the first positioning device 111 is configured to, when it is determined by the processing module 11 that the signal strength of the external positioning signal increases from being not greater than the predefined strength threshold to being greater than the predefined strength threshold (i.e., the processing module 11 switching from the second recording mode to the first recording mode), perform positioning based on the external positioning signal so as to obtain a coordinate set of an exact position ($P_{N'}$) of the processing module 11 (see FIG. 3). Subsequently, the processor 114 is configured to compute, based on the second path record and the coordinate set of the exact position ($P_{N'}$) of the processing module 11, corrected path data related to the second path record, and to generate a movement path record based on the first path record and the corrected path data. Referring to FIGS. 5 and 6, the movement path record indicates a surrounding boundary (b) which defines and surrounds a working area (A).

It is worth to note that the determination as to whether the signal strength of the external positioning signal is greater than the predefined strength threshold may be made by the processor 114 or by the first positioning device 111. In one embodiment, the processor 114 obtains the signal strength of the external positioning signal via the first positioning device 111, and makes the aforementioned determination by comparing the signal strength of the external positioning signal and the predefined strength threshold. In one embodiment, the first positioning device 111 receives the external positioning signal, makes the aforementioned determination by comparing the signal strength of the external positioning signal and the predefined strength threshold, and transmits a result of the aforementioned determination to the processor 114.

Figure 2:
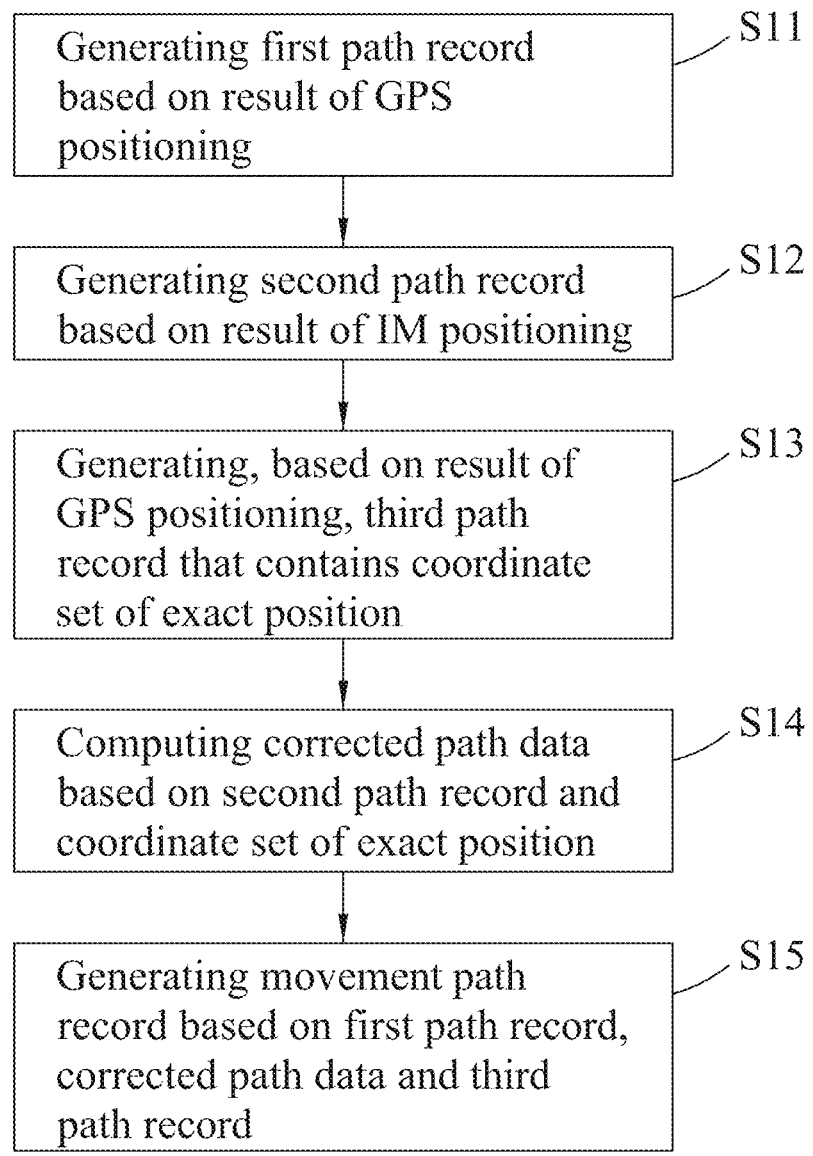
FIG. 2 is a flow chart illustrating an embodiment of a tracking procedure included in a method of movement tracking according to the disclosure.
Figure 4:
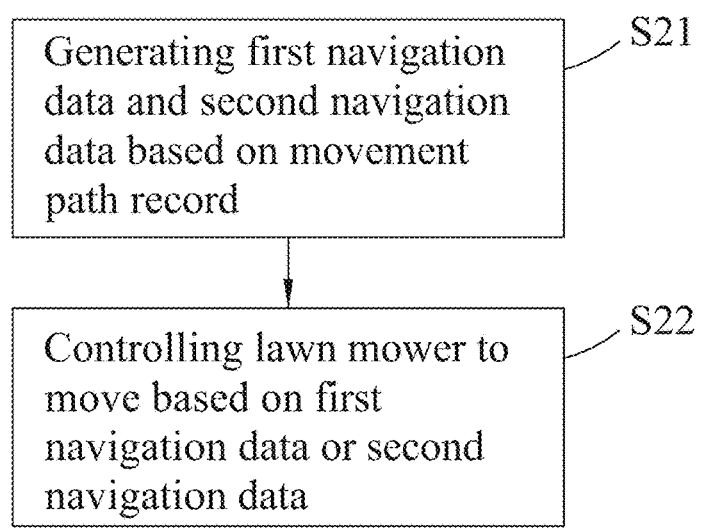
FIG. 4 is a flow chart illustrating an embodiment of a planning and navigation procedure included in the method according to the disclosure.

Referring to FIGS. 2 and 4, an embodiment of a method of movement tracking according to the disclosure is illustrated. The method according to the disclosure is implemented by the processing module 11 that is previously described. The method includes a tracking procedure as shown in FIG. 2, and a planning and navigation procedure as shown in FIG. 4.

In this embodiment, the planning and navigation procedure is executed subsequent to the tracking procedure. In a scenario where grasses in the working area (A) as exemplarily shown in FIGS. 5 and 6 are to be cut, the tracking procedure has to be executed by the processing module 11 at first so as to define the working area (A) for the lawnmower 1 to move around in the working area (A) and cut grasses therein. After the working area (A) has been specified, the planning and navigation procedure is executed by the processing module 11 such that the lawnmower 1 automatically moves all around the working area (A) and cuts grasses therein. It should be noted that the tracking procedure should be executed in a condition that the lawnmower 1 is being operated to move by a user. For example, in a scenario where the working area (A) is a yard, the user has to operate the lawnmower 1 to make a loop around the yard at first so as to allow the processing module 11 to execute the tracking procedure.

It should be noted that in one embodiment, the tracking procedure is executed to define at least one region of obstacle(s) (e.g., a building, a pool, a tree, a flowerbed or the like) in the working area (A). In other words, the movement path record further indicates at least one obstacle boundary which defines an obstacle therein, and the obstacle boundary may later be taken into consideration in the planning and navigation procedure. In this way, the lawn mower 1 moving in the working area (A) will automatically avoid the obstacle.

Referring to FIG. 2, the tracking procedure includes steps S11 to S15 delineated below.

Initially, it is assumed that at the moment the lawn mower 1 starts being operated by the user to move, the signal strength of the external positioning signal (i.e., the GPS signal) is greater than the predefined strength threshold. When the lawn mower 1 is activated and operated by the user to start moving, the processing module 11 determines whether the signal strength is greater than the predefined strength threshold. When it is determined that the signal strength of the external positioning signal is greater than the predefined strength threshold, the processing module 11 operates in the first recording mode, and step S11 is performed.

In step S11, the processor 114 of the processing module 11 generates the first path record that indicates a first movement path (t1) as shown in FIG. 3 based on the result of the positioning performed by the first positioning device 111 (hereinafter also referred to as GPS positioning), and keeps updating the first path record. In particular, the first path record contains a first group of coordinate sets which are generated by the first positioning device 111 based on the GPS positioning, which respectively correspond to positions that are sequentially arranged, and which cooperatively indicate the first movement path (t1).

Then, it is assumed that the lawnmower 1 is operated by the user to move to a dead zone where the signal strength of the external positioning signal is not greater than the predefined strength threshold. When it is determined that the signal strength is not greater than the predefined strength threshold, the processing module 11 switches to the second recording mode, and the flow of procedure proceeds to step S12.

In step S12, the processor 114 of the processing module 11 in the second recording mode generates the second path record that indicates a second movement path (t2) following the first movement path (t1) as shown in FIG. 3 based on the result of the positioning performed by the second positioning device 112 (hereinafter also referred to as IM positioning), and keeps updating the second path record. In particular, the second path record contains a second group of coordinate sets which are generated by the second positioning device 112 based on the IM positioning, which respectively correspond to positions that are sequentially arranged, and which cooperatively indicate the second movement path (t2). In the following description, it is assumed that there are totally N number of coordinate sets in the second group of coordinate sets, where N is a positive integer greater than one.

Subsequently, it is assumed that the lawn mower 1 is operated by the user to move to leave the dead zone. When it is determined by the processing module 11 that the signal strength of the external positioning signal increases from being not greater than the predefined strength threshold to being greater than the predefined strength threshold, the processing module 11 switches from the second recording mode to the first recording mode, and the flow of procedure proceeds to step S13.

In step S13, the first positioning device 111 performs positioning based on the external positioning signal (i.e., performing the GPS positioning) so as to obtain the coordinate set of the exact position ($P_{N'}$) of the processing module 11 based on the GPS positioning. The first positioning device 111 further periodically performs the GPS positioning so as to locate the processing module 11 to allow the processor 114 to generate a third path record that indicates a third movement path (t3) starting from the exact position ($P_{N'}$). In particular, the third path record contains a third group of coordinate sets which are generated by the first positioning device 111 based on the GPS positioning, which respectively correspond to positions that are sequentially arranged, and which cooperatively indicate the third movement path (t3). The coordinate set of the exact position ($P_{N'}$) is the leading one of coordinate sets in the third group of coordinate sets. The exact position ($P_{N'}$) represents a position of the lawn mower 1 at which the processing module 11 determines that the signal strength of the external positioning signal increases from being not greater than the predefined strength threshold to being greater than the predefined strength threshold, and at which the processing module 11 switches from the second recording mode to the first recording mode.

It is noted that as shown in FIG. 3, a deviation ($\Delta$) exists between an end position ($P_N$) of the second movement path (t2) and the exact position ($P_{N'}$). Since the error in the positioning result obtained by the second positioning device 112 may accumulate over time during the IM positioning, the deviation ($\Delta$) may increase as more coordinate sets in the second group are generated. That is to say, the longer the second movement path (t2), the greater the deviation ($\Delta$). To correct the second movement path (t2), the flow of procedure proceeds to step S14.

In step S14, the processor 114 computes the corrected path data based on the deviation ($\Delta$) between the end position ($P_N$) of the second movement path (t2) and the exact position ($P_{N'}$). The corrected path data indicates a corrected movement path (t2') following the first movement path (t1) and terminating at the coordinate set of the exact position ($P_{N'}$). In particular, the corrected path data contains a corrected group of coordinate sets which respectively specify positions that are sequentially arranged and which cooperatively indicate the corrected movement path (t2'). The coordinate sets in the corrected group respectively correspond to the coordinate sets in the second group, and thus there are totally N number of coordinate sets in the corrected group. The processor 114 computes each coordinate set in the corrected group based on a corresponding coordinate set in the second group and the coordinate set of the exact position ($P_{N'}$) of the processing module 11. By utilizing the corrected group of coordinate sets, accumulated error made in the IM positioning performed by the processing module 11 is corrected, and thus movement of the lawn mower 11 may be faithfully and correctly recorded.

In this embodiment, positions of the lawn mower 1 are expressed in the two-dimensional Cartesian coordinate system, and each coordinate set has an X-element and a Y-element. For example, a difference set ($x_{diff}, y_{diff}$) representing the deviation ($\Delta$) has a difference value in X-axis $x_{diff}$ that is obtained by subtracting an X-element $x'_N$ of the coordinate set ($x'_N, y'_N$) that represents the exact position ($P_{N'}$) from an X-element $x_N$ of the coordinate set ($x_N, y_N$) that represents the end position ($P_N$) of the second movement path (t2), and a difference value in Y-axis $y_{diff}$ that is obtained by subtracting a Y-element $y'_N$ of the coordinate set ($x'_N, y'_N$) that represents the exact position ($P_{N'}$) from a Y-element $y_N$ of the coordinate set ($x_N, y_N$) that represents the end position ($P_N$) of the second movement path (t2).

More specifically, to obtain each coordinate set in the corrected group, the processor 114 computes the coordinate set by shifting the corresponding coordinate set in the second group by a weighted deviation. The weighted deviation is equal to the deviation ($\Delta$) multiplied by a weight and the weight is related to an ordinal number of the corresponding coordinate set in the second group divided by a total number of coordinate sets in the second group (i.e., N).

For example, referring to FIG. 3, for the n-th coordinate set ($x_n, y_n$) in the second group that represents an n-th position ($P_n$) on the second movement path (t2), where n is a positive integer in a numerical range ranging from 2 to N and represents the ordinal number of the coordinate set ($x_n, y_n$) in the second group, the processor 114 computes an X-element $x'_n$ of a corresponding n-th coordinate set ($x'_n, y'_n$) in the corrected group that represents a corresponding n-th position ($P_{n'}$) on the corrected movement path (t2') by subtracting, from an X-element $x_n$ of the n-th coordinate set ($x_n, y_n$) in the second group, the difference value in X-axis $x_{diff}$ of the difference set ($x_{diff}, y_{diff}$) multiplied by a weight which is equal to the ordinal number of the n-th coordinate set ($x_n, y_n$) in the second group divided by the total number of coordinate sets in the second group, i.e., $$\frac{n}{N}$$

Similarly, the processor 114 computes a Y-element $y'_n$ of the corresponding n-th coordinate set ($x'_n, y'_n$) in the corrected group by subtracting, from a Y-element $y_n$ of the n-th coordinate set ($x_n, y_n$) in the second group, the difference value in Y-axis $y_{diff}$ of the difference set ($x_{diff}, y_{diff}$) multiplied by the weight. In brief, the aforementioned computation can be expressed by a mathematical formula shown below.

$$(x'_n, y'_n) = (x_n, y_n) - \left[(x_{diff}, y_{diff}) \times \frac{n}{N}\right]$$

It is worth to note that the weight is set to zero for the first coordinate set ($x_1, y_1$) in the second group of coordinate sets, and increases as the ordinal number of the coordinate set increases. In other words, the later a coordinate set is in the second group of coordinate sets in chronological order, the larger the weight that corresponds to the coordinate set is.

It should be noted that since only the coordinate set of the exact position ($P_{N'}$) is required for computing the corrected path data, computation of the corrected path data may be performed while the processing module 11 is generating the third path record based on the result of the GPS positioning.

Thereafter, it is assumed that the signal strength of the external positioning signal remains greater than the predefined strength threshold until the lawn mower 1 is operated by the user to finish defining the working area (A), i.e., to complete the loop around the working area (A). Eventually, the procedure proceeds to step S15.

In step S15, the processor 114 generates the movement path record based on the first path record, the corrected path data and the third path record. As what has been previously mentioned, the movement path record indicates the surrounding boundary (b) which outlines the working area (A).

It is worth to note that in the abovementioned scenario, the lawnmower 1 has only passed the dead zone (i.e., an area where the signal strength of the external positioning signal is not greater than the predefined strength threshold) once during the tracking procedure. However, the number of times for which the lawn mower 1 passes the dead zone(s) during the tracking procedure is not limited to the disclosure herein and may vary in other embodiments. In a scenario where the lawnmower 1 is to pass the dead zone(s) multiple times during the tracking procedure, steps S12 to S14 will be executed by the processing module 11 multiple times. That is to say, whenever it is determined that the signal strength of the external positioning signal is greater than the predefined strength threshold, the processing module 11 switches to the second recording mode and generates a second path record based on the result of the IM positioning performed by the second positioning device 112. Whenever it is determined that the signal strength of the external positioning signal increases from being not greater than the strength threshold to being greater than the strength threshold, the processing module 11 switches back to the first recording mode, and generates, based on the result of GPS positioning performed by the first positioning device 111, a third path record that contains the coordinate set of the exact position ($P_{N'}$) of the processing module 11. In addition, the processor 114 computes, based on the second path record and the coordinate set of the exact position ($P_{N'}$), the corrected path data to achieve an effect of correcting the error caused by the IM positioning.

Referring to FIG. 4, the planning and navigation procedure includes step S21 and S22 delineated below.

In step S21, the processor 114 generates first navigation data and second navigation data based on the movement path record. More specifically, referring to FIG. 5, the first navigation data contains entries of first working path data that respectively indicate a plurality of first working paths (r1) which are arranged in sequence in the working area (A) and which are parallel to and spaced apart from each other. Moreover, two consecutive ones of the first working paths (r1) are directed to opposite directions. Referring to FIG. 6, the second navigation data contains entries of second working path data that respectively indicate a plurality of second working paths (r2) which are arranged in sequence in the working area (A) and which are parallel to and spaced apart from each other. Likewise, two consecutive ones of the second working paths (r2) are directed to opposite directions.

It is worth to note that any adjacent two of the second working paths (r2) arranged in the working area (A) are closer to each other than any adjacent two of the first working paths (r1) arranged in the working area (A) are to each other. In this embodiment, a distance between any adjacent two of the second working paths (r2) is half of the distance between any adjacent two of the first working paths (r1), but is not limited thereto. Consequently, the number of the first working paths (r1) passing through a unit area in the working area (A) is less than the number of the second working paths (r2) passing through the unit area.

In step S22, the processing module 11 receives a navigation-enabling signal, and is activated by the navigation-enabling signal to control the lawn mower 1 to automatically move based on one of the first navigation data and the second navigation data. The navigation-enabling signal may be generated based on a user operation at a nearby location or at a remote location. In one embodiment, the navigation-enabling signal may be automatically generated by the control module 14 at a designated time point, for example 10 A.M. every day.

In autonomous operation of the lawn mower 1, the processing module 11 determines whether the signal strength of the external positioning signal is greater than a predefined power threshold. The predefined power threshold is equal to the predefined strength threshold in this embodiment, but is not limited thereto in other embodiments.

When it is determined by the processing module 11 that the signal strength of the external positioning signal is greater than the predefined power threshold, the processing module 11 operates in a first navigation mode. In the first navigation mode, the first positioning device 111 performs positioning based on the external positioning signal so as to locate the processing module 11, and, based on the first navigation data and the result of the positioning performed by the first positioning device 111, the processor 114 outputs to the control module 14 a first navigation signal that is related to the first working paths (r1).

After receiving the first navigation signal, the control module 14 controls, based on the first navigation signal, the driving module 12 to drive the main body of the lawn mower 1 to move along the first working paths (r1) as exemplarily shown in FIG. 5, one after the other, and controls the cutting module 13 to cut grasses at the same time.

On the other hand, when it is determined by the processing module 11 that the signal strength of the external positioning signal is not greater than the predefined power threshold, the processing module 11 operates in a second navigation mode. In the second navigation mode, the second positioning device 112 performs positioning by means of inertial measurement so as to locate the processing module 11, and, based on the second navigation data and the result of the positioning performed by the second positioning device 112, the processor 114 outputs to the control module 14 a second navigation signal that is related to the second working paths (r2).

Similarly, after receiving the second navigation signal, the control module 14 controls, based on the second navigation signal, the driving module 12 to drive the main body of the lawn mower 1 to move along the second working paths (r2) as exemplarily shown in FIG. 6, one after the other, and controls the cutting module 13 to cut grasses at the same time. In this way, automation of the lawn mower 1 is realized.

It is worth to note that when it is determined by the processing module 11 that the signal strength of the external positioning signal decreases from being greater than the predefined power threshold to being not greater than the predefined power threshold, the processing module 11 switches from the first navigation mode to the second navigation mode, and the processor 114 outputs the second navigation signal to the control module 14 based on the second navigation data and the result of the IM positioning performed by the second positioning device 112. Subsequently, the control module 14 controls, based on the second navigation signal, the driving module 12 to drive the main body of the lawn mower 1 to move from a current position on one of the first working paths (r1) to a closest one of the second working paths (r2) that is closest to the current position, and then to follow the closest one of the second working paths (r2) to continue cutting grasses.

Similarly, when it is determined by the processing module 11 that the signal strength of the external positioning signal increases from being not greater than the predefined power threshold to being greater than the predefined power threshold, the processing module 11 switches from the second navigation mode to the first navigation mode, and the processor 114 outputs the first navigation signal to the control module 14 based on the first navigation data and the result of the GPS positioning performed by the first positioning device 111. Subsequently, the control module 14 controls, based on the first navigation signal, the driving module 12 to drive the main body of the lawn mower 1 to move from a current position on one of the second working paths (r2) to a closest one of the first working paths (r1) that is closest to the current position, and then to follow the closest one of the first working paths (r1) to continue cutting grasses.

Since any adjacent two of the second working paths (r2) arranged in the working area (A) are closer to each other than any adjacent two of the first working paths (r1) arranged in the working area (A), tracks of the lawnmower 1 would be more dense, meaning that more areas would be repeatedly worked by the lawn mower 1, when the processing module 11 operates in the second navigation mode than in the first navigation mode. In this way, adverse effect (e.g., incomplete coverage of grass cutting in the working area (A)) caused by the relatively inaccurate navigation in the second navigation mode due to the error existing in the IM positioning can be mitigated.

In one embodiment where the working area (A) and a surrounding area outside the working area (A) and nearby the surrounding boundary (b) have rather definite color distinctions, whenever the processing module 11 is in the first navigation mode or the second navigation mode, the processor 114 determines, based on the result of the positioning (relying on the external positioning signal or by means of inertial measurement), whether a distance between the processing module 11 and the surrounding boundary (b) is smaller than a predetermined distance threshold, i.e., whether the processing module 11 is nearby the surrounding boundary (b). When it is determined that the distance between the processing module 11 and the surrounding boundary (b) is smaller than the predetermined distance threshold, the processor 114 controls the image capturing device 113 to perform image capturing so as to generate the image data. Next, the processor 114 determines, by means of color recognition based on the image data, whether the processing module 11 has reached the surrounding boundary (b). When it is determined that the processing module 11 has reached the surrounding boundary (b), the processor 114 outputs the first navigation signal or the second navigation signal to the control module 14 such that the lawn mower 1 turns and moves to a subsequent one of the first working paths (r1) or a subsequent one of the second working paths (r2).

In one implementation, color recognition performed on the image data is implemented by using an artificial neural network that has been trained in advance by conducting an algorithm of machine learning, but implementation of the color recognition in other embodiments is not limited thereto. More specifically, the processor 114 distinguishes a boundary between a lawn zone and a none-lawn zone based on color patterns and color variations. Hence, determination as to whether the processing module 11 has reached the surrounding boundary (b) may be correctly made based on machine vision realized by the processor 114 and the image capturing device 113.

In one embodiment, the processing module 11 is separable from the main body of the lawn mower 1, and is capable of independently executing the tracking procedure of the method according to the disclosure when the processing module 11 is separated from the main body of the lawn mower 1. That is to say, during the tracking procedure of the method, the processing module 11 is not required to be moved along with rest of the lawn mower 1. For example, the processing module 11 may be separated from the main body of the lawn mower 1, and then be carried by the user to make a loop around the working area (A) so as to define the working area (A) with the loop serving as the surrounding boundary (b). Therefore, the user does not have to operate the whole lawn mower 1 to make a loop for defining the working area (A), which saves labor and enhances convenience of use.

In one embodiment, the processing module 11 does not include the image capturing device 113, and the method includes the tracking procedure but not the planning and navigation procedure. Moreover, the processing module 11 may be mounted on different kinds of devices such as an electronic device (e.g., a robot vacuum cleaner, a mobile sprinkler or a smart watch), a wearable accessory (e.g., a wristband, a watch, a necklace, a collar), a transportation device (e.g., a vehicle) and so on. Additionally, the tracking procedure simply involves tracking movement of the aforementioned devices but not defining the working area (A).

To sum up, the method of movement tracking according to the disclosure utilizes the processing module 11 to periodically perform positioning based on the external positioning signal when the signal strength of the external positioning signal is greater than the predefined strength threshold, to periodically perform positioning by means of inertial measurement when the signal strength of the external positioning signal is not greater than the predefined strength threshold, and to selectively generate the first or second path record based on the result of the positioning. Moreover, the processing module 11 is utilized to obtain the coordinate set of the exact position of the processing module 11 when it is determined that the signal strength of the external positioning signal increases from being not greater than the predefined strength threshold to being greater than the predefined strength threshold, to compute corrected path data based on the second path record and the coordinate set of the exact position, and to generate the movement path record based on the first path record and the corrected path data. In this way, the movement of the processing module 11 can be exactly tracked, and the processing module 11 is capable of planning reliable working paths for navigating the lawn mower 1 based on the movement path record thus generated. In addition, it is not necessary to use physical objects to define a boundary of the working area for a lawn mower, thereby enhancing convenience and reliability of use.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of movement tracking, the method to be implemented by a processing module included in a lawn mower, the lawn mower further including a control module, said method comprising, before a working area is defined:

A) periodically performing, when it is determined by the processing module that signal strength of an external positioning signal is greater than a predefined strength threshold, positioning based on the external positioning signal so as to locate the processing module, and generating a first path record based on a result of the positioning;

B) periodically performing, when it is determined by the processing module that the signal strength of the external positioning signal is not greater than the predefined strength threshold, measurement of a variation in movement of the processing module, and generating a second path record based on a result of the measurement of the variation in movement;

C) performing, when it is determined by the processing module that the signal strength of the external positioning signal increases from being not greater than the predefined strength threshold to being greater than the predefined strength threshold, positioning based on the external positioning signal so as to obtain a coordinate set of an exact position ($P_{N'}$) of the processing module; and D) computing, based on the second path record and the coordinate set of the exact position of the processing module, corrected path data related to the second path record, and generating a movement path record based on the first path record and the corrected path data, wherein the movement path record indicates a surrounding boundary which defines and surrounds the working area, said method further comprising, after the working area is defined:

E) generating first navigation data and second navigation data based on the movement path record, the first navigation data containing plural entries of first working path data that respectively indicate a plurality of first working paths which are arranged in sequence in the working area and which are parallel to and spaced apart from each other, the second navigation data containing plural entries of second working path data that respectively indicate a plurality of second working paths which are arranged in sequence in the working area and which are parallel to and spaced apart from each other, any adjacent two of the second working paths arranged in the working area are closer to each other than any adjacent two of the first working paths arranged in the working area are to each other;

F) when it is determined by the processing module that the signal strength of the external positioning signal is greater than a predefined power threshold, operating in a first navigation mode where the processing module performs positioning based on the external positioning signal so as to locate the processing module, and outputs to the control module, based on the result of the positioning and the first navigation data, a first navigation signal that is related to the first working paths; and G) when it is determined by the processing module that the signal strength of the external positioning signal is not greater than the predefined power threshold, operating in a second navigation mode where the processing module performs positioning by means of inertial measurement so as to locate the processing module, and outputs to the control module, based on the result of the positioning and the second navigation data, a second navigation signal that is related to the second working paths, wherein after receiving the first navigation signal, the control module controls, based on the first navigation signal, the lawn mower to move along the first working paths to cut grass, and wherein after receiving the second navigation signal, the control module controls, based on the second navigation signal, the lawn mower to move along the second working paths to cut grass.

2. The method as claimed in claim 1, wherein:

in step A), generating a first path record includes generating the first path record that indicates a first movement path;

in step B), generating a second path record includes generating the second path record that indicates a second movement path following the first movement path; and in step D), computing corrected path data includes computing the corrected path data based on a deviation between an end position of the second movement path and the exact position the coordinate set of which is obtained in step C), the corrected path data indicating a corrected movement path following the first movement path and terminating at the coordinate set of the exact position.

3. The method as claimed in claim 2, wherein:

in step A), generating a first path record includes generating the first path record that contains a first group of coordinate sets which respectively correspond to positions that are sequentially arranged and which cooperatively indicate the first movement path;

in step B), generating a second path record includes generating the second path record that contains a second group of coordinate sets which respectively correspond to positions that are sequentially arranged and which cooperatively indicate the second movement path; and in step D), computing corrected path data includes computing the corrected path data that contains a corrected group of coordinate sets which respectively specify positions that are sequentially arranged and which cooperatively indicate the corrected movement path, the coordinate sets in the corrected group respectively corresponding to the coordinate sets in the second group, and computing each coordinate set in the corrected group based on a corresponding coordinate set in the second group and the coordinate set of the exact position of the processing module obtained in step C).

4. The method as claimed in claim 3, wherein step D) includes, computing each coordinate set in the corrected group by shifting the corresponding coordinate set in the second group by a weighted deviation, where the weighted deviation is equal to the deviation between the end position of the second movement path and the exact position of the processing module multiplied by a weight, and the weight is related to an ordinal number of the corresponding coordinate set in the second group divided by a total number of coordinate sets in the second group.

5. The method as claimed in claim 1, wherein:
step C) further includes periodically performing, when it is determined by the processing module that the signal strength of the external positioning signal increases from being not greater than the predefined strength threshold to being greater than the predefined strength threshold, positioning based on the external positioning signal so as to locate the processing module, and generating a third path record based on the result of the positioning; and
in step D), generating a movement path record includes generating the movement path record based on the first path record, the corrected path data and the third path record.

6. The method as claimed in claim 1, wherein each of steps F) and G) includes:
determining, based on the result of the positioning, whether a distance between the processing module and the surrounding boundary is smaller than a predetermined distance threshold;
performing, when it is determined that the distance between the processing module and the surrounding boundary is smaller than the predetermined distance threshold, image capturing so as to generate image data; and
determining, by means of color recognition based on the image data, whether the processing module has reached the surrounding boundary.

7. A processing module of a lawn mower that includes a control module, said processing module comprising:
a first positioning device;
a second positioning device; and
a processor electrically connected to said first positioning device and said second positioning device,
wherein before a working area is defined, said first positioning device is configured to, when it is determined by said processing module that signal strength of an external positioning signal is greater than a predefined strength threshold, periodically perform positioning based on the external positioning signal so as to locate said processing module, and said processor is configured to generate a first path record based on a result of the positioning performed by said first positioning device,
said second positioning device is configured to, when it is determined by said processing module that the signal strength of the external positioning signal is not greater than the predefined strength threshold, periodically perform measurement of a variation in movement of said processing module, and said processor is configured to generate a second path record based on a result of the measurement of the variation in movement performed by said second positioning device,
said first positioning device is further configured to, when it is determined by said processing module that the signal strength of the external positioning signal increases from being not greater than the predefined strength threshold to being greater than the predefined strength threshold, perform positioning based on the external positioning signal so as to obtain a coordinate set of an exact position of said processing module,
said processor is further configured to compute, based on the second path record and the coordinate set of the exact position of said processing module, corrected path data related to the second path record, and to generate a movement path record based on the first path record and the corrected path data, and
the movement path record indicates a surrounding boundary which defines and surrounds the working area,
wherein after the working area is defined,
said processor is further configured to generate first navigation data and second navigation data based on the movement path record, the first navigation data containing plural entries of first working path data that respectively indicate a plurality of first working paths which are arranged in sequence in the working area and which are parallel to and spaced apart from each other, the second navigation data containing plural entries of second working path data that respectively indicate a plurality of second working paths which are arranged in sequence in the working area and which are parallel to and spaced apart from each other, any adjacent two of the second working paths arranged in the working area are closer to each other than any adjacent two of the first working paths arranged in the working area are to each other,
said processing module is further configured to, when it is determined by said processing module that the signal strength of the external positioning signal is greater than a predefined power threshold, operate in a first navigation mode where said processing module performs positioning based on the external positioning signal so as to locate said processing module, and outputs to the control module, based on the result of the positioning and the first navigation data, a first navigation signal that is related to the first working paths,
said processing module is further configured to, when it is determined by said processing module that the signal strength of the external positioning signal is not greater than the predefined power threshold, operate in a second navigation mode where said processing module performs positioning by means of inertial measurement so as to locate said processing module, and outputs to the control module, based on the result of the positioning and the second navigation data, a second navigation signal that is related to the second working paths,
after receiving the first navigation signal, the control module controls, based on the first navigation signal, the lawn mower to move along the first working paths and to cut grass, and
after receiving the second navigation signal, the control module controls, based on the second navigation signal, the lawn mower to move along the second working paths and to cut grass.

8. The processing module as claimed in claim 7, wherein said processor is configured to:
generate the first path record that indicates a first movement path, and the second path record that indicates a second movement path following the first movement path; and
compute the corrected path data based on a deviation between an end position of the second movement path and the exact position, the corrected path data indicating a corrected movement path following the first movement path and terminating at the coordinate set of the exact position of said processing module.

9. The processing module as claimed in claim 8, wherein said processor is configured to:
- generate the first path record that contains a first group of coordinate sets which respectively correspond to positions that are sequentially arranged and which cooperatively indicate the first movement path;
- generate the second path record that contains a second group of coordinate sets which respectively correspond to positions that are sequentially arranged and which cooperatively indicate the second movement path;
- compute the corrected path data that contains a corrected group of coordinate sets which respectively specify positions that are sequentially arranged and which cooperatively indicate the corrected movement path, the coordinate sets in the corrected group respectively corresponding to the coordinate sets in the second group; and
- compute each coordinate set in the corrected group based on the corresponding coordinate set in the second group and the coordinate set of the exact position of said processing module.

10. The processing module as claimed in claim 9, wherein for each coordinate set in the corrected group, said processor is configured to compute the coordinate set through shifting the corresponding coordinate set in the second group by a weighted deviation, where the weighted deviation is equal to the deviation between the end position of the second movement path and the exact position of said processing module multiplied by a weight, and the weight is related to an ordinal number of the corresponding coordinate set in the second group divided by a total number of coordinate sets in the second group.

11. The processing module as claimed in claim 7, wherein:
said first positioning device is further configured to, when it is determined by said processing module that the signal strength of the external positioning signal increases from being not greater than the predefined strength threshold to being greater than the predefined strength threshold, periodically perform positioning based on the external positioning signal so as to locate said processing module, and said processor is configured to generate a third path record based on the result of the positioning performed by said first positioning device; and
said processor is configured to generate the movement path record based on the first path record, the corrected path data and the third path record.

12. The processing module as claimed in claim 7, further comprising:
an image capturing device electrically connected to said processor;
wherein said processor is further configured to
- determine, based on the result of the positioning, whether a distance between said processing module and the surrounding boundary is smaller than a predetermined distance threshold, and
- control, when it is determined that the distance between said processing module and the surrounding boundary is smaller than the predetermined distance threshold, said image capturing device to perform image capturing so as to generate image data, wherein said processor is configured to determine, by means of color recognition based on the image data, whether said processing module has reached the surrounding boundary.

13. A lawn mower adapted to cut grass, said lawn mower comprising the processing module as claimed in claim 7.

* * * * *